United States Patent Office 3,098,100
Patented July 16, 1963

3,098,100
PROCESS FOR THE PRODUCTION OF
DIISOPROPYL KETONE
Benjamin T. Freure, Charleston, W. Va., assignor to Union Carbide Corporation, a corporation of New York
No Drawing. Filed Apr. 28, 1960, Ser. No. 25,206
3 Claims. (Cl. 260—596)

The object of this invention is to provide a novel method for the preparation of diisopropyl ketone.

More specifically, this invention relates to a process for dehydrogenating 2,2,4-trimethyl-1,3-pentanediol in the vapor phase by using metals and their salts as catalysts.

Diisopropyl ketone is well known in the art and has been used as a solvent, as an intermediate in the preparation of plasticizers, surface active agents and amines and as an antiknock additive for gasoline.

Diisopropyl ketone has been prepared by many techniques including the chromic acid oxidation of 2,4-dimethyl-3-hydroxy-pentane-3-carboxylic acid, by reacting isobutanol in the vapor phase over magnesium isobutoxide, by hydrolysis of ethyl alpha-isobutyrylisobutyrate and by the reaction of acetone and diisopropyl carbinol in the presence of aluminum isopropoxide.

However, none of the prior art teachings visualize the simple vapor phase reaction taught here. In fact the instant process is totally unexpected in view of the existing state of the art. It is known in the art that the major product from aldols of alpha-substituted aldhydes is the original aldehyde. Since the catalysts employed in the instant process have dehydrogenating action, it would be expected that the corresponding aldol, which would revert to isobutyraldehyde, would be the primary product from this glycol. The discovery that the reaction product was in fact, diisopropyl ketone was surprising and unexpected.

Accordingly, it is an object of this invention to provide a simple process for the production of diisopropyl ketone using a readily available starting material.

It is still another object of this invention to provide a process for making diisopropyl ketone which is economical and which gives better yield of ketone than has heretofore been possible.

The conversion of 2,2,4-trimethyl-1,3-pentanediol to the ketone takes place in the presence of a catalyst. The catalysts employed are generally referred to as dehydrogenation catalysts. Examples of these catalysts include cadmium, copper, zinc, chromium, nickel, cobalt, iron, molybdenum, gold, tungsten, their oxides, borates, phosphates and other salts. The particularly preferred catalyst is cadmium phosphate.

The reaction is carried out at a temperature range of from 250 to 400° C. The preferred range is from 300–350° C., with 325° C. being particularly preferred.

The reaction is believed to take place according to the following scheme:

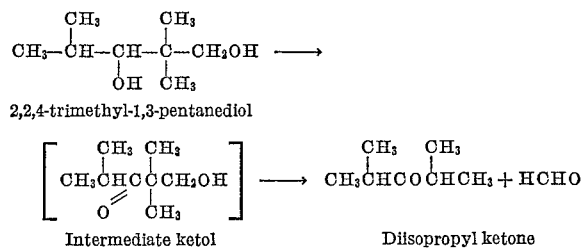

The following example illustrates the process of the instant invention.

Example

A catalyst was prepared by evaporating to dryness a slurry of 50 parts of C.P. cadmium ortho phosphate in water with 500 parts of "Filtros," a ceramically-bonded, porous, granular filter medium. The resultant coated particles were charged to a stainless steel jacketed tube, of 1.5 inch internal diameter 40 inches long. The 1.5 inch tube was arranged concentrically within a 3 inch tube and the space between was partially filled with Dowtherm, a commercial heat transfer liquid. The catalyst occupied about two-thirds of the space in the inner tube, the balance being filled with uncoated "Filtros" particles to act as a preheater and vaporizing section. Provision was made for heating the tube electrically, pumping the feed and cooling and condensing the products.

2,2,4-trimethyl-1,3-pentanediol was fed from a heated feed tank at the rate of 100 parts per hour, while maintaining a catalyst temperature of 350° C. The products were condensed below a water-cooled condenser and were distilled. There was obtained 58 parts of isobutyraldehyde, 114 parts of diisopropyl ketone and about 20 parts of paraformaldehyde, along with other products.

I claim:
1. The process for the production of diisopropyl ketone which comprises contacting 2,2,4-trimethyl-1,3-pentanediol in the vapor phase with cadmium phosphate at a temperature of from 250–400° C. and recovering the ketone formed.
2. The process of claim 1 wherein the temperature is from 300–350° C.
3. The process for the production of diisopropyl ketone which comprises contacting 2,2,4-trimethyl-1,3-propanediol in the vapor phase with cadmium phosphate at a temperature of 325° C. and recovering said ketone.

References Cited in the file of this patent
UNITED STATES PATENTS 1,813,953    Reppe _____ July 14, 1931
2,042,224    Groll et al. _____ May 26, 1936